United States Patent [19]

Yule

[11] 4,310,038

[45] Jan. 12, 1982

[54] METERING VALVE FOR BEVERAGE CONTAINERS

[76] Inventor: Lance S. Yule, Box 277, c/o Geofreeze Corp., Lorton, Va. 22079

[21] Appl. No.: 177,206

[22] Filed: Aug. 11, 1980

[51] Int. Cl.³ .................. B65B 3/06; B65D 47/00
[52] U.S. Cl. ..................... 141/351; 222/476;
  222/477; 222/517; 222/445; 222/487; 222/564
[58] Field of Search ............. 137/43, 433; 222/477,
  222/442, 449, 425, 476, 517, 67, 445, 487, 564;
  141/351–362, 369–382

[56] References Cited

U.S. PATENT DOCUMENTS

| 726,545 | 4/1903 | Langstaff | 222/477 |
| 1,668,897 | 5/1928 | Gilstrap et al. | 222/445 |
| 2,017,839 | 10/1935 | Berendt | 222/445 |
| 2,432,923 | 12/1947 | Newman | 222/477 |
| 2,873,050 | 2/1959 | Halverson | 222/449 |

Primary Examiner—Houston S. Bell, Jr.

[57] ABSTRACT

Liquid dispensing metering valve for attachment to the outlet of an inverted beverage bottle has upper and lower chambers separated by an apertured opening. The lower chamber has a dispensing opening closed by a ball plug movable in the chamber and having a portion protruding out through the opening so that it can be lifted from its seat by contact with ice cubes in a glass or the like. A buoyant ball in the upper chamber descends to partially block the opening between the chambers as the chambers empty into a glass. When the dispensing opening closes, liquid leaking past the buoyant ball fills the lower chamber and then it floats to the top of the upper chamber as it fills for re-use.

3 Claims, 3 Drawing Figures

METERING VALVE FOR BEVERAGE CONTAINERS

BACKGROUND OF THE INVENTION

This invention relates to liquid dispensing metering valves particularly for dispensing measured amounts of liquid from bottles and constitutes an improvement upon the valve of my U.S. Pat. No. 4,049,162 which is incorporated herein by reference.

Said patent shows a metering valve which may be attached to an inverted bottle. It has an internal metering chamber with an inlet from the bottle outlet and a dispensing outlet closed by a lever-actuated cover. Inside the chamber is a ball which floats in the liquid when the chamber is full but drops as the chamber empties to close the dispensing outlet, thus dispensing a measured quantity of liquid each time the lever is actuated. When the cover is allowed to close after each dispensing operation the ball can leave its seat in the dispensing opening and again float to the top of the chamber as the latter refills.

While the above device functions as intended, it has been found that its high cost of manufacture is a deterrant to its commercialization. It is therefore the object of the present invention to provide a dispensing and metering valve of the general type disclosed in my said patent which can be manufactured at much less cost and which will nevertheless perform its metering and dispensing function satisfactorily.

SHORT STATEMENT OF THE INVENTION

In accordance with the invention I provide a liquid dispensing metering valve comprising a housing defining an upper internal metering chamber and a lower internal dispensing chamber separated from each other by a wall having metering opening therein. The metering chamber is provided with inlet means adapted for connection to the outlet of a container for the liquid to be dispensed. The outlet chamber is provided with a liquid dispensing opening at its bottom.

A ball is positioned in the metering chamber floatable in the liquid to be dispensed therefrom and a movable plug is positioned in the dispensing chamber. The ball normally floats at the top of said metering chamber when the latter is full and is adapted, when liquid drains from the metering chamber into the dispensing chamber, to descend and partially seal the metering opening when the metering chamber has been emptied. The plug normally seals the dispensing opening when both chambers are full and has a portion protruding below the rim of the opening. Thus when the plug is partially lifted, as by being engaged by a part of a beverage glass or its contents both chambers will empty, the ball will descend and partially block the metering opening, to cut off the effective flow of liquid, thereby causing the dispensing chamber to refill after the plug has reseated itself, and thereafter the metering chamber to refill as the ball rises away from the metering opening. Means are also provided to establish communication between the interior of the container and the atmosphere to admit air to replace the volume of liquid dispensed. Preferably the plug comprises a second ball positioned in the dispensing chamber and the leakage from the metering chamber to the dispensing chamber is due to serrations in the periphery of the metering opening whereby said ball does not effect complete closure of the same.

Further objects, features and advantages of the invention will become apparent from the following detailed description of a preferred embodiment thereof taken in conjunction with the accompanying drawings.

DETAILED DESCRIPTION OF PREFERRED EMBODIMENT

Figure 1:
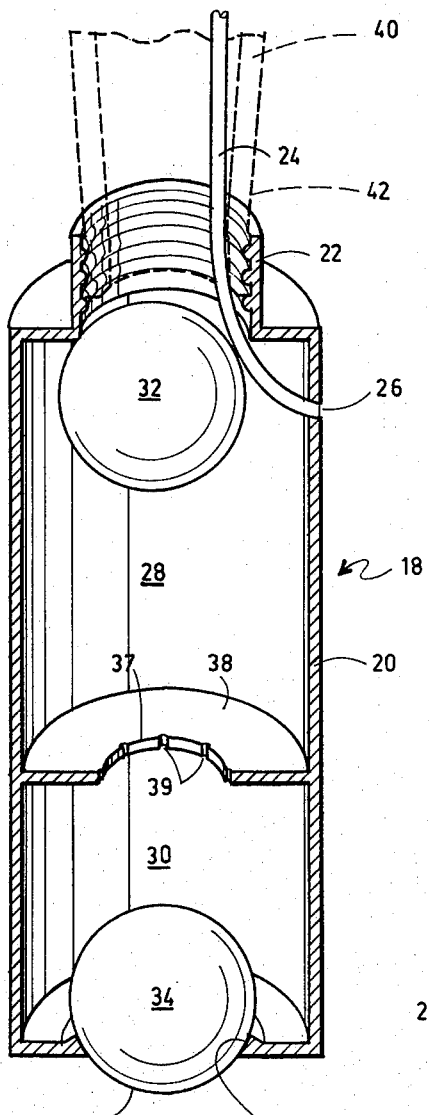
FIG. 1 is a vertical section, in part isometric, through a dispensing metering valve of the invention shown attached to the neck of an inverted beverage bottle.

Referring to the three figures of the drawing, a presently preferred embodiment of a liquid dispensing metering valve for use with inverted beverage containers is indicated generally by the numeral 18. It comprises a housing 20 which is divided by partition 38 into an upper metering chamber 28 and a lower dispensing chamber 30. The partition 38 is provided with a circular opening 37 between the two chambers and the periphery of the opening is provided with serrations 39 for a purpose which will presently appear. The bottom chamber 30 has a circular dispensing opening 36 in its bottom. The upper end of the device terminates in an inlet defined by neck 22 which is attachable to the outlet of a beverage bottle 40, only the neck 42 of which has been shown. The neck 22 may be constructed and arranged either to embrace the inlet neck 42 or to fit within it.

Leading to an opening 26 in the wall of the chamber 28 is a tube 24 which, as the device is attached to the bottle, leads into the bottle interior with its upper end near or above the liquid level therein when the bottle is inverted so that ambient air may enter the bottle to replace the liquid as it is dispensed.

Within the metering chamber 28 is positioned a buoyant ball 32. A second ball 34 is located in the dispensing chamber 30. Ball 34 acts as a movable plug to seal opening 36 when it is in its lowermost position and has a portion 50 thereof protruding through the opening. Ball 32 is arranged normally to float in the liquid contained in metering chamber 28, but to descend as liquid empties therefrom and partially block opening 37 when chamber 28 has emptied. The partial blockage is due to the presence of the serrations 39 which permit a small amount of liquid to leak past the ball when it otherwise would close the opening.

Figure 2:
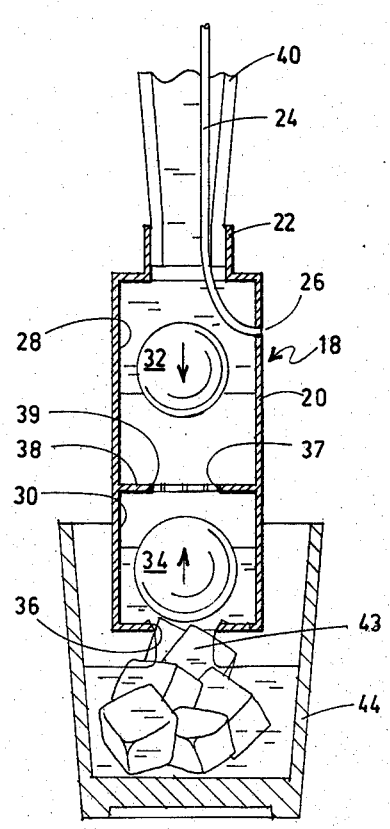
FIG. 2 is a similar view, on a somewhat smaller scale, showing how the device may be actuated by engagement with ice cubes contained in a beverage glass.

In operation, it will be seen that if the lower ball or plug 34 is pushed up, as by contacting portion 50 with an ice cube 43 in a glass 44 (FIG. 2), the liquid in the chambers will drain into the glass. When upper ball 32 has descended to partially seal opening 37 only a trickle of liquid will continue to drain from the upper chamber into the lower chamber and thence into the glass and this will signal the user (e.g., a bartender) to remove the glass and thus permit ball 34 to drop into sealing engagement with the rim of opening 36 to plug it. During the draining of liquid from the bottle 40 the drained volume is replaced by air through tube 24.

Figure 3:
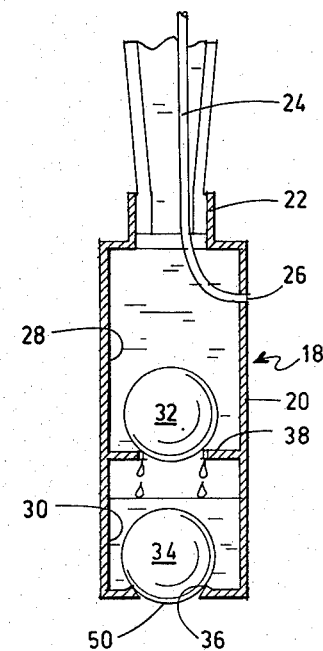
FIG. 3 is a view similar to FIG. 2 showing how the chambers of the valve refill after the beverage glass has been removed from contact with the ice cubes.

Now, with spherical plug 34 sealing the opening the parts of the device assume the positions shown in FIG. 3. Liquid continues to fill chamber 30 by leaking through the serrations 39 in opening 37. Ball 34 continues to seal chamber 30. When the latter is full, chamber 28 begins to refill and ball 32 rises to the top of the chamber. When chamber 28 is full no further liquid will enter the device until the ball plug 34 is once again pressed upwardly.

The device of the invention is simpler in construction and operation than that of my prior U.S. Pat. No. 4,049,162, requires fewer machined parts and eliminates need for an external lever to operate the metering chamber closure.

It is apparent that the ball 34 may be displaced from its opening 36 by any foreign object, such as the bottom of an empty beverage glass, and hence, the usefulness of the device is not limited to the case of glasses previously filled with ice cubes. It is also clear that a plug equivalent to a ball may be substituted for the ball 34 so long as a portion thereof protrudes through the dispensing opening 36 so that it may be displaced upwardly by contact with an object, such as an ice cube or the bottom of a beverage glass.

Accordingly, it is intended that the scope of the invention be limited only by the proper interpretation to be afforded the appended claims.

I claim:

1. A liquid dispensing metering valve comprising
   a housing defining an upper internal metering chamber and a lower internal dispensing chamber separated from each other by a wall having a metering opening therein;
   said metering chamber being provided with inlet means adapted for connection to the outlet of a container for the liquid to be dispensed, and
   said outlet chamber being provided with a liquid dispensing opening at its bottom;
   a ball in said metering chamber floatable in the liquid to be dispensed therefrom;
   a movable plug in said dispensing chamber
   said ball normally floating at the top of said metering chamber when it is full and being adapted, when liquid drains from said metering chamber into said dispensing chamber, to descend and only partially close said metering opening when said metering chamber has emptied;
   said plug normally sealing said dispensing opening when said two chambers are full and having a portion protruding below the same;
   whereby partially lifting said plug, as by engaging said projecting portion with a part of a beverage glass or its contents, will open said liquid dispensing opening and permit both said chambers to empty and said ball to descend and partially block said metering opening, and, when said plug has reseated itself, to permit said dispensing chamber and said metering chamber to refill successively and said ball to rise from said metering opening; and
   means establishing communication between the interior of said container and the atmosphere to admit air to replace the volume of liquid dispensed.

2. The combination of claim 1 wherein the periphery of said metering opening is serrated to permit leakage of liquid from said metering chamber to said dispensing chamber when said ball is seated in said metering opening.

3. The combination of claim 1 or claim 2 wherein said plug comprises a second ball.

* * * * *